United States Patent
Sun

(10) Patent No.: US 11,380,017 B2
(45) Date of Patent: Jul. 5, 2022

(54) DUAL-VIEW ANGLE IMAGE CALIBRATION METHOD AND APPARATUS, STORAGE MEDIUM AND ELECTRONIC DEVICE

(71) Applicant: SHENZHEN SENSETIME TECHNOLOGY CO., LTD., Shenzhen (CN)

(72) Inventor: Wenxiu Sun, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 345 days.

(21) Appl. No.: 16/710,033

(22) Filed: Dec. 11, 2019

(65) Prior Publication Data

US 2020/0111234 A1 Apr. 9, 2020

Related U.S. Application Data

(63) Continuation of application No. PCT/CN2018/091085, filed on Jun. 13, 2018.

(30) Foreign Application Priority Data

Jun. 14, 2017 (CN) .................. 201710448540.X

(51) Int. Cl.
 *H04N 13/246* (2018.01)
 *H04N 13/239* (2018.01)
 *G06T 7/80* (2017.01)

(52) U.S. Cl.
 CPC ............. *G06T 7/85* (2017.01); *H04N 13/239* (2018.05); *H04N 13/246* (2018.05); *G06T 2207/10012* (2013.01)

(58) Field of Classification Search
 CPC . G06T 7/85; G06T 2207/10012; G06T 7/593; H04N 13/239; H04N 13/246; H04N 5/247; H04N 17/002

(Continued)

(56) References Cited

U.S. PATENT DOCUMENTS 9,648,300 B2 5/2017 He et al.
10,489,912 B1* 11/2019 Brailovskiy ......... H04N 13/246
(Continued)

FOREIGN PATENT DOCUMENTS

CN 101916454 A 12/2010
CN 102065313 A 5/2011
(Continued)

OTHER PUBLICATIONS

Hiroshi Kawakami, Yoshihiro Ito, and Yasushi Kanazawa, "A Robust Method for Detecting Planar Regions Based on Random Sampling Using Distributions of Feature Points", Japan, Institute of Electronics, Information and Communication Engineers, Feb. 1, 2005, J88-D-II volume, No. 2, and p. 313-324.

(Continued)

*Primary Examiner* — Susan E. Torgerson
(74) *Attorney, Agent, or Firm* — Syncoda LLC; Feng Ma

(57) ABSTRACT

A dual-view angle image calibration method includes: performing feature matching on a first image pair to obtain a first feature point pair set, the first image pair including two images respectively photographed corresponding to two different view angles of a same scene; obtaining multiple different first fundamental matrices of the first image pair at least according to the first feature point pair set, and obtaining first image deformation information indicating relative deformation between the first image pair after mapping transformation is performed through the first fundamental matrices and the first image pair before the mapping transformation is performed; determining a first optimization fundamental matrix from the multiple first fundamental matrices at least according to the first image deformation information; and calibrating the first image pair according to the first optimization fundamental matrix.

18 Claims, 12 Drawing Sheets

(58) Field of Classification Search
USPC .................................................... 348/207
See application file for complete search history.

(56) References Cited

U.S. PATENT DOCUMENTS

| | | | | |
|---|---|---|---|---|
| 2013/0135439 | A1* | 5/2013 | Kaku | .................. H04N 13/00 |
| | | | | 348/46 |
| 2015/0103147 | A1 | 4/2015 | Ho et al. | |
| 2015/0341618 | A1 | 11/2015 | He et al. | |
| 2016/0150211 | A1* | 5/2016 | Hwang | ............... H04N 13/128 |
| | | | | 348/43 |
| 2017/0270678 | A1* | 9/2017 | Masumoto | ............... G06T 7/33 |

FOREIGN PATENT DOCUMENTS

| | | | |
|---|---|---|---|
| CN | 103345736 | A | 10/2013 |
| CN | 104019799 | A | 9/2014 |
| CN | 104316057 | A | 1/2015 |
| CN | 104581136 | A | 4/2015 |
| CN | 105635719 | A | 6/2016 |
| CN | 105654459 | A | 6/2016 |
| CN | 106204731 | A | 12/2016 |
| JP | 2013114505 | A | 6/2013 |
| JP | 2014010495 | A | 1/2014 |
| JP | 2017059049 | A | 3/2017 |

OTHER PUBLICATIONS

Mihail Georgiev, Atanas Gotchev, Miska Hannuksela, "A Fast and Accurate Re-Calibration Technique for Misaligned Stereo Cameras", 2013 IEEE International Conference on Image Processing, Sep. 15, 2013, p. 24-28.

First Office Action of the Japanese application No. 2019-569277, dated Feb. 2, 2021.

Ma Yongzhuang, Liu Weijun, "A New Robust Rectification Algorithm of Uncalibrated Stereo Pairs", Computer Engineering vol. 32 No. 5, Mar. 2006.

First Office Action of the Chinese application No. 201710448540.X, dated Aug. 4, 2021.

Charles Loop, Zhengyou Zhang, "Computing Rectifying Homographies for Stereo Vision", issued on Apr. 8, 1999, Technical Report, MSR-TR-99-21.

International Search Report in the international application No. PCT/CN2018/091085, dated Sep. 14, 2018.

English translation of the Written Opinion of the International Search Authority in the international application No. PCT/CN2018/091085, dated Sep. 14, 2018.

Liu Yiguang, Al. "Stereo image correction for 3d reconstruction", Journal of Sichuan University (Engineering Science Edition), vol. 45 No. 3, p. 79-p. 84, May 2013.

Second Office Action of the Chinese application No. 201710448540.X, dated Dec. 23, 2021.

* cited by examiner

DUAL-VIEW ANGLE IMAGE CALIBRATION METHOD AND APPARATUS, STORAGE MEDIUM AND ELECTRONIC DEVICE

CROSS-REFERENCE TO RELATED APPLICATIONS

The present application is a continuation of International Application No. PCT/CN2018/091085 filed on Jun. 13, 2018, which claims priority to Chinese Patent Application No. 201710448540.X filed on Jun. 14, 2017. The disclosures of these applications are hereby incorporated by reference in their entirety.

BACKGROUND

Dual-view angle image calibration is a key step for processing two images of different view angles (such as two images taken by a dual camera). Corresponding pixels on the two images are located on the same horizontal line, which is a precondition for processing such as image depth of field calculation.

SUMMARY

Embodiments of the present disclosure relate to the computer vision technologies, and in particular, to a dual-view angle image calibration method and apparatus, a storage medium and an electronic device, and an image processing method and apparatus, a storage medium and an electronic device.

Embodiments of the present disclosure provide a dual-view angle image calibration technical solution and an image processing solution.

According to an aspect of the embodiments of the present disclosure, provided is a dual-view angle image calibration method, including: performing feature matching on a first image pair to obtain a first feature point pair set, where the first image pair includes two images respectively photographed corresponding to two different view angles of a same scene; obtaining multiple different first fundamental matrices of the first image pair at least according to the first feature point pair set, and obtaining first image deformation information indicating relative deformation between the first image pair after mapping transformation is performed through the multiple different first fundamental matrices and the first image pair before the mapping transformation is performed; determining a first optimization fundamental matrix from the multiple different first fundamental matrices at least according to the first image deformation information; and calibrating the first image pair according to the first optimization fundamental matrix.

According to another aspect of the embodiments of the present disclosure, also provided is an image processing method, including: performing calibration on at least one image pair respectively photographed corresponding to two different view angles of a same scene by using the dual-view angle image calibration method according to any one of the foregoing items; and performing application processing based on a calibrated image pair, where the application processing includes at least one of the following: three-dimensional reconstruction processing, image blurring processing, depth of field calculation, or augmented reality processing.

According to still another aspect of the embodiments of the present disclosure, also provided is a dual-view angle image calibration apparatus, including: a feature matching module, configured to perform feature matching on a first image pair to obtain a first feature point pair set, where the first image pair includes two images respectively photographed corresponding to two different view angles of a same scene; a first obtaining module, configured to obtain multiple different first fundamental matrices of the first image pair at least according to the first feature point pair set, and obtain first image deformation information indicating relative deformation between the first image pair after mapping transformation is performed through the multiple different first fundamental matrices and the first image pair before the mapping transformation is performed; a first determining module, configured to determine a first optimization fundamental matrix from the multiple different first fundamental matrices at least according to the first image deformation information; and a first calibrating module, configured to calibrate the first image pair according to the first optimization fundamental matrix.

According to yet another aspect of the embodiments of the present disclosure, also provided is an image processing apparatus, configured to perform calibration on at least one image pair respectively photographed corresponding to two different view angles of a same scene by using the dual-view angle image calibration method according to any one of the foregoing items, and perform application processing based on a calibrated image pair, where the application processing includes at least one of the following: three-dimensional reconstruction processing, image blurring processing, depth of field calculation, or augmented reality processing.

According to yet another aspect of the embodiments of the present disclosure, also provided is a non-transitory computer readable storage medium having computer-readable instructions stored thereon, where execution of the instructions by a processor causes the processor to perform operations of the above dual-view angle image calibration method or the above image processing method.

According to yet another aspect of the embodiments of the present disclosure, also provided is an electronic device, including a processor and a memory, where the memory is configured to store at least one executable instruction, where execution of the at least one executable instruction enables the processor to execute operations corresponding to the above dual-view angle image calibration method and/or execution of the at least one executable instruction enables the processor to execute operations corresponding to the above image processing method.

According to yet another aspect of the embodiments of the present disclosure, also provided are computer programs, including computer readable codes, where when the computer readable codes run in a device, a processor in the device executes instructions for implementing operations in the above dual-view angle image calibration method or the above image processing method.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
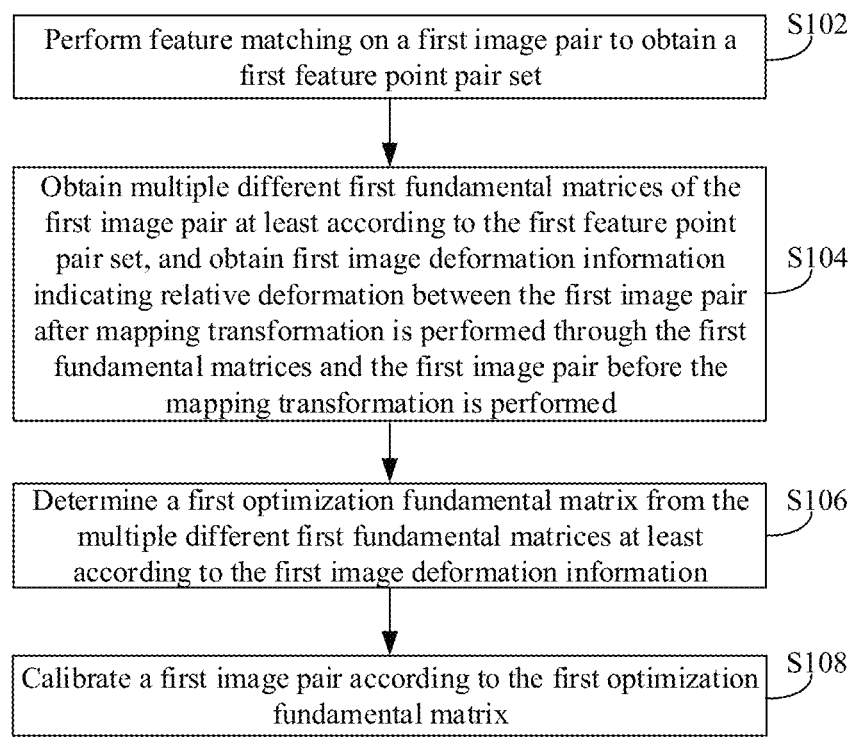
FIG. 1 is a flowchart of a dual-view angle image calibration method according to one embodiment of the present disclosure.

The following further describes in detail implementations of embodiments of the present disclosure by combining the accompanying drawing (the same reference numerals in several accompanying drawings represent the same elements) and embodiments. The following embodiments are intended to illustrate the present disclosure, but are not intended to limit the scope of the present disclosure.

In the dual-view angle image calibration method according to embodiments of the present disclosure, feature matching is performed on a first image pair obtained by photographing the same scene at different view angles to obtain a first feature point pair set corresponding to the first image pair, and multiple different first fundamental matrices are obtained according to the first feature point pair set, and first image deformation information corresponding to each of the first fundamental matrices is obtained, so as to determine a first optimization fundamental matrix according to the first image deformation information, and calibration is performed on the first image pair according to the first optimization fundamental matrix so as to achieve automatic calibration of the dual-view angle image pair, thereby effectively avoiding calibration errors caused by errors of calibration parameters which are caused by the displacement of the lens due to the collision.

A person skilled in the art may understand that the terms such as "first" and "second" in the embodiments of the present disclosure are only used to distinguish different operations, devices or modules, etc., and do not represent any specific technical meaning or an inevitable logical sequence therebetween.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of a dual-view angle image calibration method according to one embodiment of the present disclosure. Referring to FIG. 1, at operation S102, feature matching is performed on a first image pair to obtain a first feature point pair set. The first image pair includes two images respectively photographed corresponding to two different view angles of a same scene.

In some embodiments, two images included in the first image pair are obtained by photographing the same scene by means of two photographing elements at the same time based on two different view angles. The two photographing elements may be integrated or separated. For example, the image pair is obtained by photographing by means of a dual-camera device (such as a dual-camera mobile phone) integrated with two cameras at a time. Alternatively, two images included in the first image pair are obtained by photographing the same scene by means of a same camera at different times based on two different view angles.

In the embodiments, after the first image pair is obtained, feature detection and extraction is performed on two images included in the first image pair, and matching is performed on feature points extracted from the two images to obtain a set of matching feature points on the two images as a first feature point pair set. In the feature detection and extraction of the first image pair, a convolutional neural network, a color histogram, a Histogram of Oriented Gradient (HOG), Small Univalue Segment Assimilating Nucleus (SUSAN) and other methods may be used, but are not limited thereto. In the feature matching of the extracted feature points, gray-scale correlation matching, a Scale-Invariant Feature Transform (SIFT) algorithm, a Speeded-Up Robust Features (SURF) algorithm, and other methods may be used, but are not limited thereto.

In an example, operation S102 may be performed by a processor by invoking a corresponding instruction stored in a memory, and may also be performed by a feature matching module 402 run by the processor.

At operation S104, multiple different first fundamental matrices of the first image pair are obtained at least according to the first feature point pair set, and first image deformation information indicating relative deformation between the first image pair after mapping transformation is performed through the first fundamental matrices and the first image pair before the mapping transformation is performed is obtained.

The fundamental matrix is a geometric relationship between two two-dimensional images obtained at two different viewpoints of the same three-dimensional scene. In the embodiments, the fundamental matrix may indicate a matching relationship between feature point pairs on two images of the first image pair. For example, the fundamental matrix may be a 3×3 matrix, representing epipolar geometry between the first image and the second image.

In the embodiments, the method for obtaining the first fundamental matrix and the first image deformation information is not limited, and multiple first fundamental matrices may be calculated according to the first feature point pair set of the first image pair, and methods for calculating corresponding first image deformation information may be applied to the embodiments to obtain the first image deformation information. For example, an 8-point method of linearly calculating a fundamental matrix, or a RANdom Sample Comsensus (RANSAC) and the like may be used to obtain multiple different first fundamental matrices according to the first feature point pair set. For another example, during calculation of the first image deformation information, for two images in the first image pair, the deformation degree of the two images is separately calculated according to the change in the number of corresponding feature point pairs on the image before and after the mapping transformation, or the distance between the feature point pairs, etc., and then the first image deformation information is comprehensively calculated by weighting, summation, and the like.

In an example, operation S104 may be performed by a processor by invoking a corresponding instruction stored in a memory, or may be performed by a first obtaining module 404 run by the processor.

At operation S106, a first optimization fundamental matrix is determined from multiple first fundamental matrices at least according to the first image deformation information.

The first optimization fundamental matrix is a first fundamental matrix that may accurately represent the matching relationship between the feature point pairs in the first feature point pair set in the obtained multiple first fundamental matrices. The first optimization fundamental matrix is determined according to the first image deformation information, which is equivalent to determining the first optimization fundamental matrix according to the degree of image deformation. For example, it may be determined that the first fundamental matrix having a smaller deformation degree of the first image pair is the first optimization fundamental matrix, thereby improving the accuracy of the obtained first optimization fundamental matrix.

In some embodiments, the first fundamental matrix having a minimum relative deformation degree between the first image pairs is obtained from multiple first fundamental matrices as the first optimization fundamental matrix according to the first image deformation information.

In practical applications, the first optimization fundamental matrix may also be determined by combining the first image deformation information with other factors such as the matching error of the first fundamental matrix and the proportion of the feature point pairs satisfying the matching error of the first fundamental matrix, to further improve the accuracy of the determined first optimization fundamental matrix.

In an example, operation S106 may be performed by a processor by invoking a corresponding instruction stored in a memory, or may be performed by a first determining module 406 run by the processor.

At operation S108, a first image pair is calibrated according to the first optimization fundamental matrix.

In some embodiments, the first optimization fundamental matrix is decomposed into a first transformation matrix and a second transformation matrix, and two images in the first image pair are respectively transformed based on the first transformation matrix and the second transformation matrix to implement calibration of the first image pair. For the two images in the calibrated first image pair, the matched key point pairs are located on the same horizontal line, and the matched key point pairs of the calibrated first image pair may be located at the same depth, facilitating subsequent image processing operations such as three-dimensional reconstruction processing, image blurring, depth of field calculation, and augmented reality processing of the first image pair.

In an example, operation S108 may be performed by a processor by invoking a corresponding instruction stored in a memory, or may be performed by a first calibrating module 408 run by the processor.

According to the dual-view angle image calibration method of the embodiments of the present disclosure, feature matching is performed on a first image pair obtained by photographing the same scene at different view angles to obtain a first feature point pair set corresponding to the first image pair, and multiple different first fundamental matrices are obtained according to the first feature point pair set, and first image deformation information corresponding to each of the first fundamental matrices is obtained, so as to determine a first optimization fundamental matrix according to the first image deformation information, and calibration is performed on the first image pair according to the first optimization fundamental matrix so as to achieve automatic calibration of the dual-view angle image pair.

In practical applications, the dual-view angle image calibration method of the embodiments may be used to perform automatic calibration on the image pairs photographed by the dual-camera device, which effectively avoids calibration errors caused by errors of calibration which are caused by the displacement of the lens due to the factors such as collision. Moreover, for the dual-camera device, it is unnecessary to set up a complicated dual-camera calibration device before delivery, and no special personnel is required to calibrate by photographing the checkerboard image, which reduces the production difficulty of the dual-camera device and improves the production efficiency.

The dual-view angle image calibration method of the embodiments may be performed by a camera, a processor, or a dual-camera device, etc. However, it should be apparent to a person skilled in the art that in practical applications, any device or processor having corresponding image processing and data processing functions may execute the dual-view angle image calibration method of the embodiments of the present disclosure with reference to the embodiments.

Figure 2:
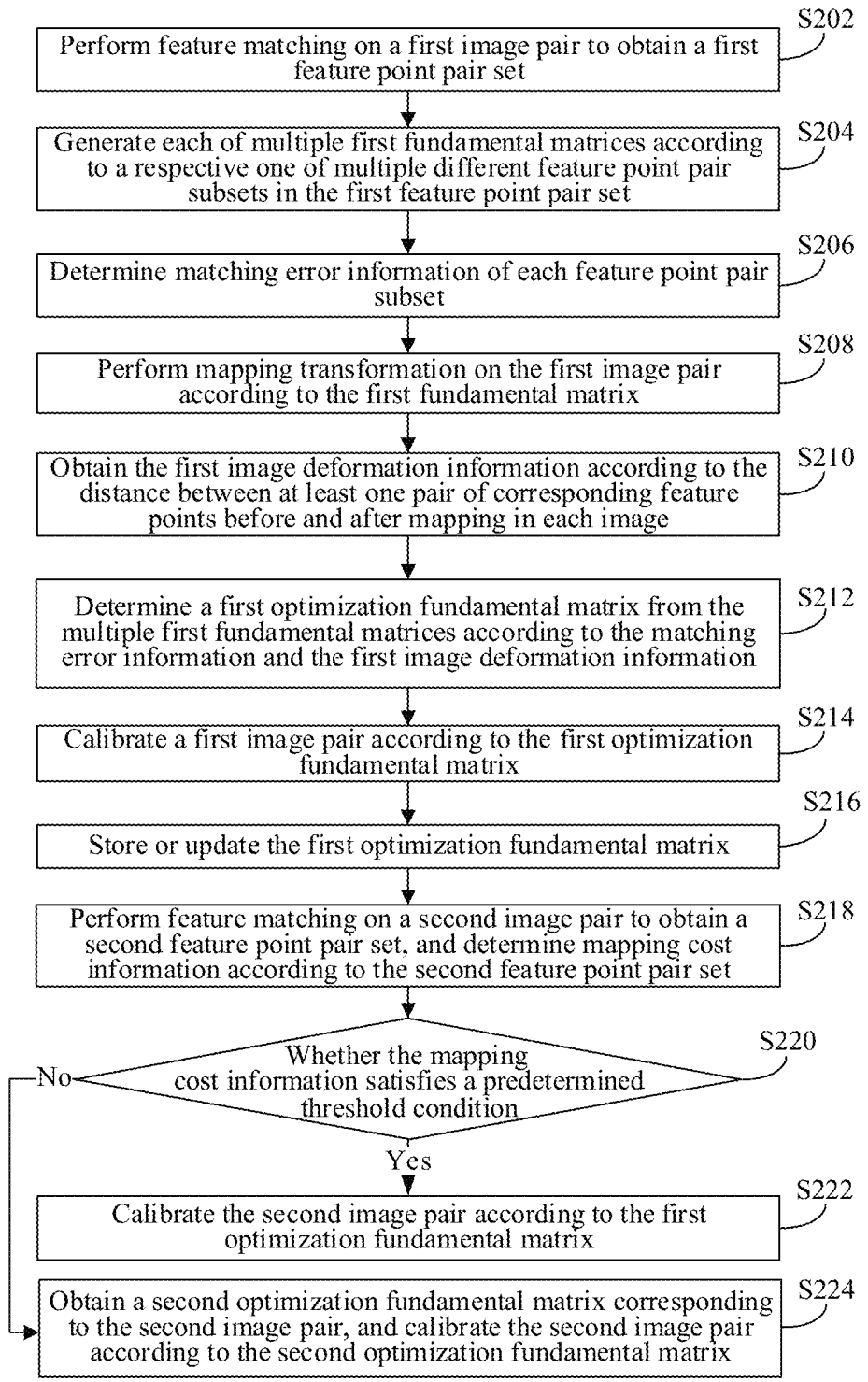
FIG. 2 is a flowchart of a dual-view angle image calibration method according to another embodiment of the present disclosure.

FIG. 2 is a flowchart of a dual-view angle image calibration method according to another embodiment of the present disclosure. Referring to FIG. 2, at operation S202, feature matching is performed on a first image pair to obtain a first feature point pair set.

The first image pair includes two images respectively photographed corresponding to two different view angles of a same scene. The first image pair may be obtained by two separately arranged cameras or by one device having two cameras at a time, or may be obtained by sequentially photographing the same scene by a camera at different view angles.

In the embodiments, the dual-view angle image calibration method of the present disclosure is described by taking an image photographed by a device having two cameras (a dual-camera device) as an example.

Figure 3:
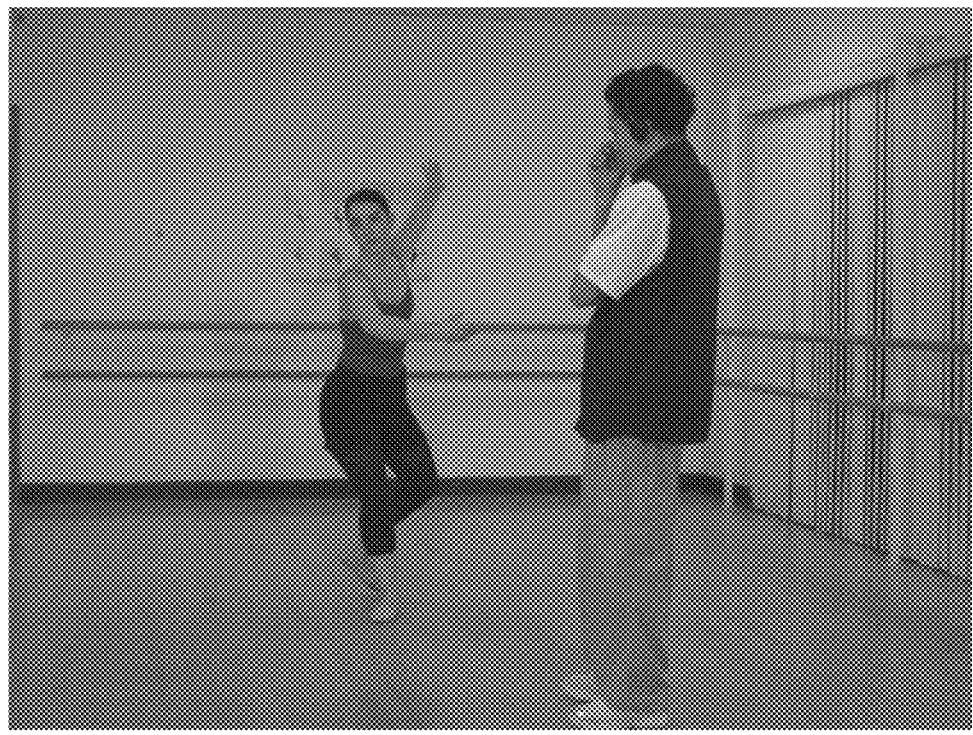
FIG. 3 is a first image showing a first image pair according to another embodiment of the present disclosure.
Figure 4:
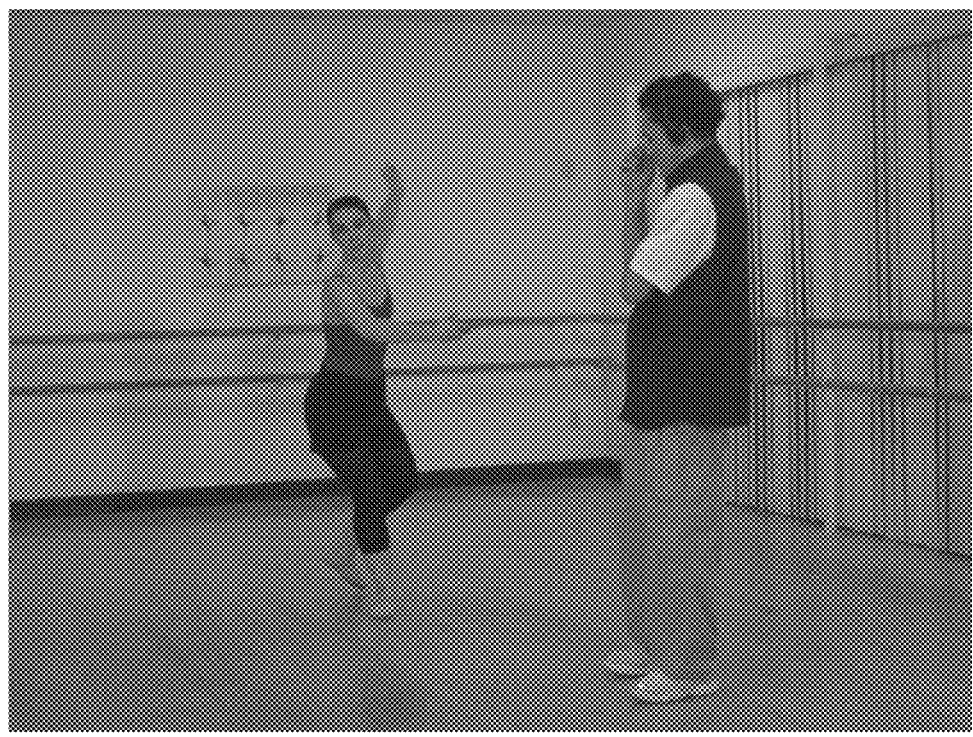
FIG. 4 is a second image showing the first image pair according to another embodiment of the present disclosure.
Figure 5:
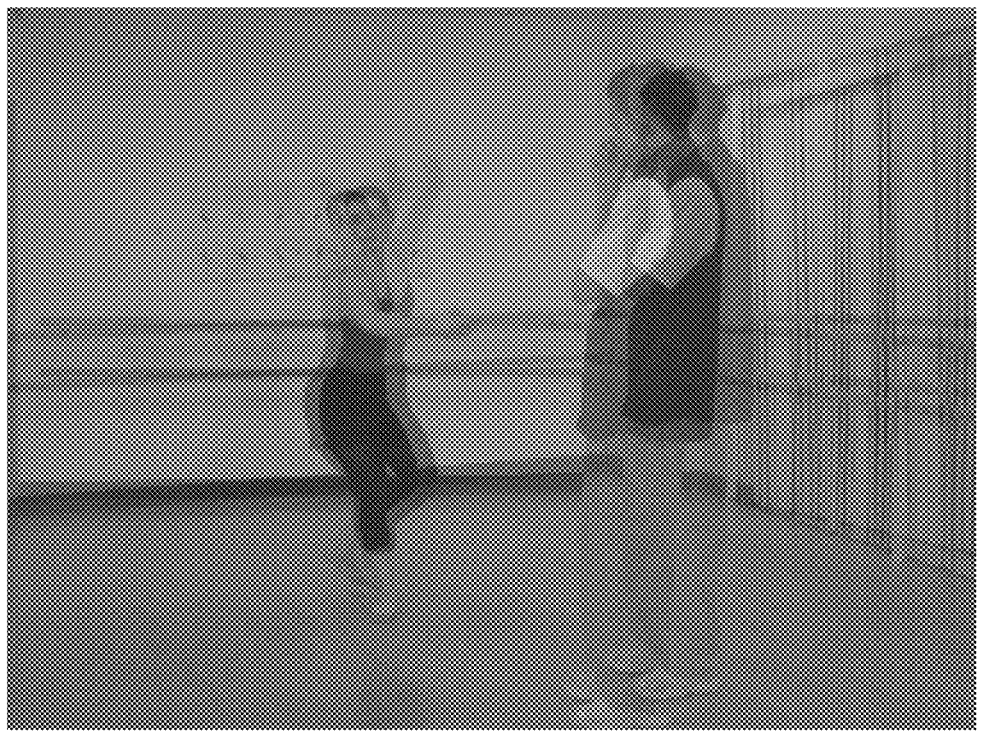
FIG. 5 is a composite image showing the first image pair according to another embodiment of the present disclosure.

For example, FIGS. 3 and 4 illustrate a first image and a second image included in the first image pair photographed by the dual-camera device. The two images have the same image subject, but the corresponding feature point pairs on the two images are not perfectly aligned. Referring to the composite image of the first image pair shown in FIG. 5, the top of the head, clothes, shoes, and the like of a boy are not aligned.

In an implementation, a first image pair photographed by the dual-camera device is obtained, a feature extraction operation is performed on the first image pair by using any image feature extraction method such as a convolutional neural network or a SUSAN algorithm, and feature matching is performed on the feature extracted from two images of the first image pair by using any feature matching method such as a SIFT algorithm or a SURF algorithm to obtain the first feature point pair set of the first image pair.

In an example, operation S202 may be performed by a processor by invoking a corresponding instruction stored in a memory, and may also be performed by a feature matching module 502 run by the processor.

At operation S204, each of multiple first fundamental matrices is generated according to a respective one of multiple different feature point pair subsets in the first feature point pair set.

In the embodiments, after the first feature point pair set of the first image pair is obtained, multiple (at least two) feature point pair subsets are arbitrarily selected, and a corresponding first fundamental matrix is generated according to each feature point pair subset, respectively. That is, a corresponding first fundamental matrix is separately generated according to each feature point pair subset. The feature point pair subset includes some feature point pairs in the first feature point pair set, and the selected multiple feature point pair subsets include feature point pairs that are not completely identical. That is, multiple feature point pair subsets include feature point pairs may be completely different or partially identical.

In some embodiments, when the first fundamental matrix is generated, the feature point pair subset including at least eight groups of feature point pairs is obtained, a RANSAC algorithm is used to calculate corresponding at least one matching matrix, and a matching matrix with the minimum matching error is determined as the first fundamental matrix. If x1 and x2 are the coordinates of the feature point pairs in the feature point pair subset, respectively, x1 and x2 may be represented by homogeneous coordinates, that is, the two-dimensional column vector is used to represent the two-bit coordinates. For example, x1=[u, v, 1]', and the calculated matching error of the feature point pair is x2'Fx1, where "'" indicates transposition. The smaller the matching error is, the more accurate the matching relationship of the feature point pairs indicated by the corresponding matching matrix is, and the ideal value of the matching error is zero.

In an example, operation S204 may be performed by a processor by invoking a corresponding instruction stored in a memory, or may be performed by a first obtaining module 505 run by the processor.

At operation S206, matching error information of each feature point pair subset is determined.

In some embodiments, the corresponding matching error information is determined according to the first fundamental matrix corresponding to each feature point pair subset.

In an implementation, the matching error information includes a proportion of feature point pairs that do not satisfy a predetermined matching condition in the feature point pair subset or the first feature point pair set. For example, for each feature point pair subset (or for each first fundamental matrix), the proportion of feature point pairs that do not satisfy the predetermined matching condition in the feature point pair subset or the first feature point pair set is obtained. The predetermined matching condition is that the matching error of the feature point pair in the feature point pair subset is less than a preset matching error threshold. For example, if the total number of feature point pairs in the first feature point pair set is P, and the number of key point pairs satisfying the matching error x2'Fx1<t1 in the feature point pair subset is T, the obtained proportion is (P-T)/P. Here, t1 (for example, t1 is 0.3) is a matching error threshold, and is used for screening feature point pairs that satisfy the matching relationship indicated by the first fundamental matrix from the feature point pair subset, or filtering out the feature point pairs that do not satisfy the matching relationship indicated by the first fundamental matrix. The number of feature point pairs that satisfy the matching relationship indicated by the corresponding first fundamental matrix is determined by using the proportion as the matching error information of the feature point pair subset, so as to determine the accuracy of the first fundamental matrix.

It is explained here that the matching error information of the feature point pair subset may be regarded as the matching error information of the corresponding first fundamental matrix, and the form of the matching error information is not limited to the foregoing proportion, and other forms for determining the accuracy of the matching relationship indicated by the first fundamental matrix are also possible.

In an example, operation S206 may be performed by a processor by invoking a corresponding instruction stored in a memory, or may be performed by a second determining module 510 run by the processor.

At operation S208, mapping transformation is performed on the first image pair according to the first fundamental matrix.

In some embodiments, the first optimization fundamental matrix is decomposed into a first transformation matrix and a second transformation matrix, and mapping transformation is respectively formed on two images in the first image pair based on the first transformation matrix and the second transformation matrix.

In an example, operation S208 may be performed by a processor by invoking a corresponding instruction stored in a memory, or may be performed by a first obtaining module 504 or a first obtaining unit 5042 therein run by the processor.

At operation S210, the first image deformation information is obtained according to the distance between at least one pair of corresponding feature points before and after mapping in each image.

In some embodiments, a first distance between a first vertex of the first image in the first image pair and the corresponding first mapping point on the first image subjected to mapping transformation, and a second distance between a second vertex of the second image in the first image pair and the corresponding second mapping point on the second image subjected to mapping transformation are obtained, and the first image deformation information is obtained according to the first distance and the second distance. The first distance and the second distance may be, but are not limited to, the Euclidean distance.

For example, the first vertex may include four vertices (0, 0), (0, h-1), (w-1, 0), and (w-1, h-1) of the first image, and the first distance may be the average distance D1 between the four vertices and the corresponding mapping points. Correspondingly, the second distance may be an average distance D2 between the four vertices on the second image and the corresponding mapping points, and the first image deformation information may be $\alpha(D1+D2)$, where a is a weight constant.

It is explained here that in the actual applications, after the first image deformation information is obtained by performing operations S208-S210, the matching error information is obtained by performing operation S206.

In an example, operation S210 may be performed by a processor by invoking a corresponding instruction stored in a memory, or may be performed by a first obtaining module 504 or a first obtaining unit 5042 therein run by the processor.

At operation S212, a first optimization fundamental matrix is determined from the multiple first fundamental matrices according to the matching error information and the first image deformation information.

In some embodiments, a first fundamental matrix having a small matching error and/or a small image deformation is selected from multiple first fundamental matrices as the first optimization fundamental matrix according to the matching error information and the first image deformation information. For example, the first image deformation information is preferentially selected, and the first fundamental matrix with the minimum image deformation is selected as the first optimization fundamental matrix, which is equivalent to determining the first optimization fundamental matrix only according to the first image deformation information. If the number of the first fundamental matrices with the minimum image deformation is at least two, the first fundamental matrix with the minimum matching error is selected from the at least two first fundamental matrices as the first optimization fundamental matrix according to the matching error information. For another example, by setting different weight values for the matching error information and the first image deformation information, the first optimization fundamental matrix is selected in consideration of two factors.

In a feasible implementation, by setting a mapping cost score, i.e., cost=(P-T)/P+$\alpha$(D1+D2), the first fundamental matrix with the minimum cost is selected from multiple first fundamental matrices as the first optimization fundamental matrix. The first item of cost is an alternative representation (P-T)/P of the matching error information, and the second item is an alternative expression $\alpha$(D1+D2) of the image deformation information. It should be understood that the above are merely examples, and the matching error information and the image deformation information are not limited to the foregoing expressions.

In an example, operation S212 may be performed by a processor by invoking a corresponding instruction stored in a memory, or may be performed by a first determining module 506 run by the processor.

At operation S214, a first image pair is calibrated according to the first optimization fundamental matrix.

For example, the first optimal matching matrix is decomposed into a first transformation matrix and a second transformation matrix, and mapping transformation is respectively performed on the first image and the second image of the first image pair shown in FIGS. 3 and 4 based on the first transformation matrix and the second transformation matrix. The transformed image may refer to the calibrated first image and the second image shown in FIGS. 6 and 7, respectively. Referring to FIG. 8, after combining the transformed first image and the second image, it may be determined that the feature points on the transformed first image and the second image are substantially on the same horizontal line. For example, in the combined image shown in FIG. 8, the top of the head, clothes and shoes of the boy are aligned.

Figure 6:
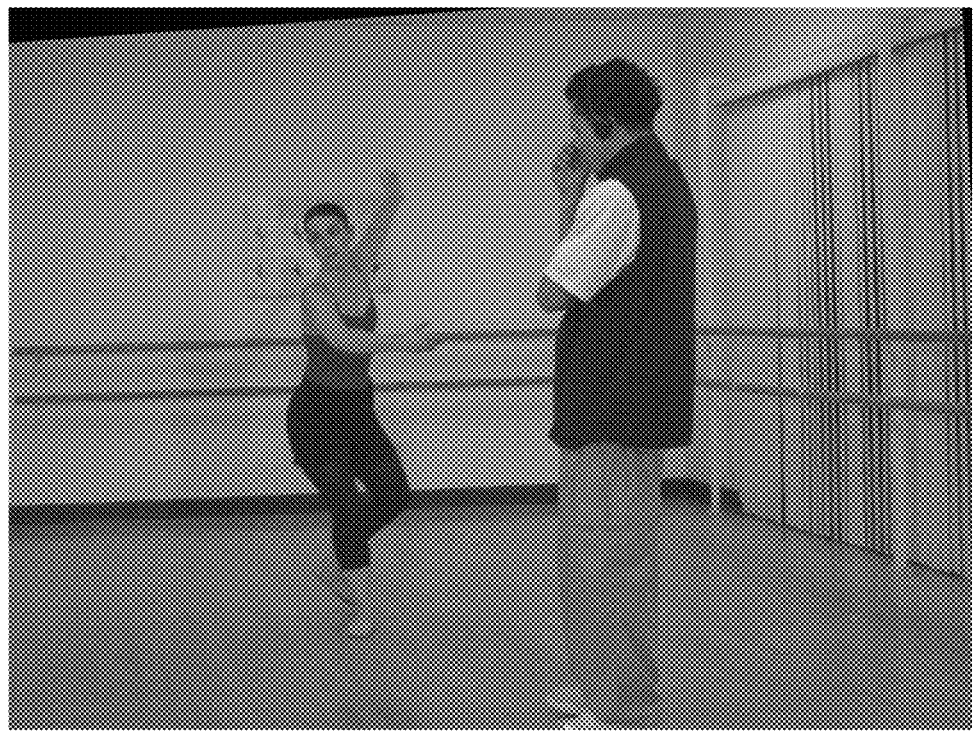
FIG. 6 is a first image showing a calibrated first image pair according to another embodiment of the present disclosure.
Figure 7:
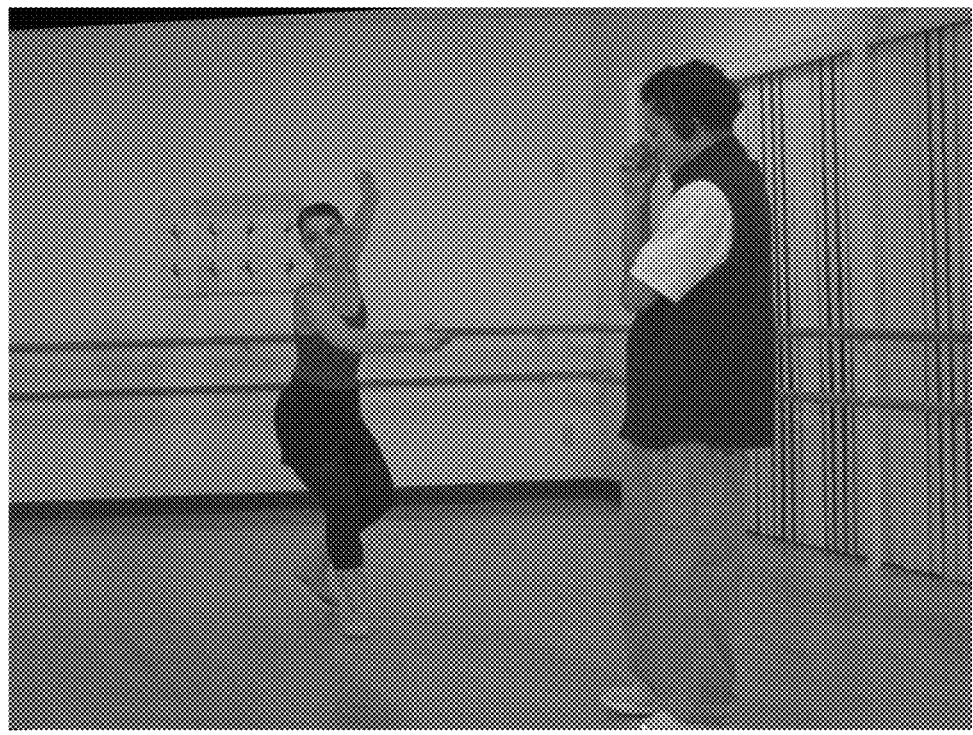
FIG. 7 is a second image showing a calibrated first image pair according to another embodiment of the present disclosure.
Figure 8:
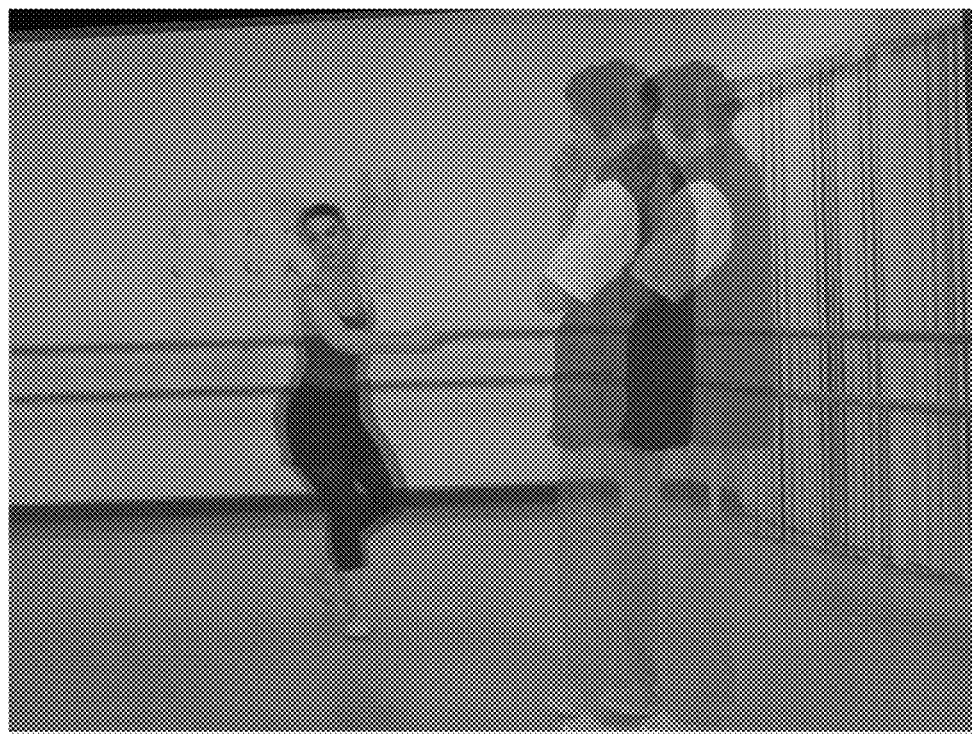
FIG. 8 is a composite image showing a calibrated first image pair according to another embodiment of the present disclosure.

In practical applications, the first image pair shown in FIGS. 3 and 4 may be used as an input, and operations S202 to S214 are performed, and the processing such as feature matching, calculating a basic matrix, determining an optimization fundamental matrix, and calibration is performed, and then the calibrated first image pair shown in FIGS. 6 and 7 is output.

In an example, operation S214 may be performed by a processor by invoking a corresponding instruction stored in a memory, or may be performed by a first calibrating module 508 run by the processor.

At operation S216, the first optimization fundamental matrix is stored or updated.

In the embodiments, after the first optimization fundamental matrix is determined, the first optimization fundamental is stored, and may be used to calibrate other image pairs photographed by the same photographing device. If the first optimization fundamental matrix is stored, the stored first optimization fundamental matrix is updated by means of the first optimization fundamental matrix determined this time.

In some embodiments, information of at least one feature point pair satisfying the predetermined matching condition and being in the first feature point pair set is stored or updated. If the feature point pair is stored, the stored feature point pair is updated. The matching information of the feature point pairs satisfying the predetermined matching condition conforms to the basic attributes of the photographing device that photographs the image pairs, and when calibration is performed on other images photographed by the same photographing device, calibration is performed on other images based on the information of the stored feature point pair in addition to the information of the feature point pairs of other image pairs. That is, calibration is performed on other images in an Incremental calibration mode. The information of the stored feature point pair at least includes, but is not limited to, coordinates of the feature point pairs, so as to calculate the corresponding fundamental matrix according to the stored feature point.

In some embodiments, a proportion of the number of stored or updated feature point pairs with respect to the total number of feature point pairs included in the feature point pair set is less than a set threshold. That is, the number of feature point pairs stored each time is limited, to avoid occupying too much storage space. In addition, the total number of stored feature point pairs may also be limited. When the total number of stored feature point pairs reaches a set number, some previously stored feature point pairs are deleted. For example, some feature point pairs whose storage time is the earliest is deleted, or some feature point pairs whose coordinates coincide are deleted.

In an example, operation S216 may be performed by a processor by invoking a corresponding instruction stored in a memory, or may be performed by a first storing module 512 run by the processor.

At operation S218, feature matching is performed on a second image pair to obtain a second feature point pair set, and mapping cost information is determined according to the second feature point pair set. The mapping cost information includes the second image deformation information of the second image pair and/or the matching error information of the feature point pair subset.

The second image pair and the first image pair are two image pairs photographed by the same camera, and the second image pair and the first image pair may be two image pairs obtained by photographing at different times and different scenes.

In some embodiments, referring to the mode of performing feature matching on the first image pair shown in the foregoing operation S202, feature matching is performed on the second image pair to obtain the second feature point pair set. Further, referring to the foregoing operations S204 to S210, the second image deformation information of the second image pair and/or the matching error information of the feature point pair subset is obtained according to the second image pair set.

In an implementation, the mapping cost information includes the foregoing mapping cost score, i.e., cost=(PT)/P+α(D1+D2), where the first item is matching error information of the feature point pair subset of the second image pair, and the second item is the second image deformation information of the second image pair. It is explained here that the alternative mode of the mapping cost information is not limited to the foregoing cost.

In an example, operation S218 may be performed by a processor by invoking a corresponding instruction stored in a memory, or may be performed by a third determining module 514 run by the processor.

At operation S220, whether the mapping cost information satisfies a predetermined threshold condition is determined.

If the mapping cost information satisfies the predetermined threshold condition, operation S222 is performed. If the mapping cost information does not satisfy the predetermined threshold condition, operation S224 is performed. Whether the matching relationship indicated by the first optimization fundamental matrix may accurately reflect the matching relationship between the feature point pairs of the second image pair is determined by means of the predetermined matching condition, so as to determine that the second image pair is calibrated by using the first optimization fundamental matrix, or the second optimization fundamental matrix is recalculated to calibrate the second image pair.

In some embodiments, when the mapping cost information is the cost, the second item of cost is the image deformation information α(D1+D2), and (D1+D2) is used to measure the image deformation degree of two images in the second image pair, which generally cannot exceed 10% of a diagonal length of the image. α may be a reciprocal of the diagonal length of any image in the second image pair. That is, if the cost is less than 0.2, a score threshold is preset to be 0.2, and the corresponding predetermined threshold condition may be that the cost is less than 0.2.

In an example, operation S220 may be performed by a processor by invoking a corresponding instruction stored in a memory, or may be performed by a third determining module 514 run by the processor.

At operation S222, a second image pair is calibrated according to the first optimization fundamental matrix.

The second image pair is calibrated according to the stored first optimization fundamental matrix in response to the mapping cost information satisfying the predetermined threshold condition. For the alternative mode, refer to the mode of calibrating the first image pair in the foregoing operation S214.

In an example, operation S222 may be performed by a processor by invoking a corresponding instruction stored in a memory, or may be performed by a second calibrating module 516 run by the processor.

At operation S224, a second optimization fundamental matrix corresponding to the second image pair is obtained, and the second image pair is calibrated according to the second optimization fundamental matrix.

The second optimization fundamental matrix corresponding to the second image pair is obtained in response to the mapping cost information not satisfying the predetermined threshold condition, and the second image pair is calibrated according to the second optimization fundamental matrix.

In some embodiments, when the mapping cost information does not satisfy the predetermined threshold condition, feature matching is performed on the second image pair to obtain the second feature point pair set of the second image pair. Multiple different second fundamental matrices of the second image pair are obtained according to the second feature point pair set and the stored feature point pair, and each of multiple pieces of the second image deformation information corresponding to a respective one of the multiple different second fundamental matrices is obtained. The second optimization fundamental matrix is determined from multiple second fundamental matrices at least according to the second image deformation information. Calibration is performed on the second image pair according to the determined second optimization fundamental matrix. Further, the matching error information of the feature point pair subset of the second image pair may also be obtained to determine the second optimization fundamental matrix by combining the second image deformation information.

In an example, operation S224 may be performed by a processor by invoking a corresponding instruction stored in a memory, or may be performed by a second obtaining module 518 and a third calibrating module 520 run by the processor.

The above is the dual-view angle image calibration method of the embodiments. In practical applications, the method may be used to calibrate the image pair photographed by a dual-camera device (a device having two cameras), or may calibrate the dual-view angle images of the same scene sequentially photographed by an ordinary photographic device.

For the image pairs photographed by the dual-camera device, the method may be performed to calibrate the photographed image pair during later image processing, or may be performed in the process of photographing the image pair and generating the image pair.

In the process of photographing and generating an image pair by means of the dual-camera device, the method is performed to calibrate the obtained image pair to directly generate the calibrated image pair, so that the dual-camera device may be bound to other application processing, thereby improving the image processing efficiency. Here, the dual-camera device includes, but is not limited to, a dual-camera mobile terminal, dual-camera smart glasses, a dual-camera robot, a dual-camera unmanned aerial vehicle, or a dual-camera unmanned vehicle.

For example, the dual-camera mobile terminal (such as the dual-camera mobile phone) executes the method in the process of photographing an image pair, to directly obtain the calibrated image pair, and also facilitate directly performing depth of field calculation, image blurring and the like on the obtained calibrated image pair. For another example, the dual-camera unmanned aerial vehicle executes the method in the process of photographing an image pair, and generates a calibrated image pair, which facilitates directly obtaining information from the calibrated image pair for stereoscopic matching, three-dimensional scene reconstruction, etc., and efficiently obtains a stereoscopic vision system.

Moreover, the dual-view angle calibration method of the embodiments may perform full-automatic calibration on the image pair photographed by the dual-camera device, and may effectively avoid the calibration error caused by the errors of calibration due to the movement of the dual-camera lens in use. Moreover, it is unnecessary to set completed dual-camera calibration device on the dual-camera device before delivery, which reduces the production difficulty of the dual-camera device and improves the production efficiency.

According to the dual-view angle image calibration method of the embodiments of the present disclosure, feature matching is performed on a first image pair obtained by photographing the same scene at different view angles to obtain a first feature point pair set corresponding to the first image pair, and multiple different first fundamental matrices are obtained according to the first feature point pair set, and first image deformation information corresponding to each of the first fundamental matrices is obtained, so as to determine a first optimization fundamental matrix according to the first image deformation information, and calibration is performed on the first image pair according to the first optimization fundamental matrix so as to achieve automatic calibration of the dual-view angle image pair. Moreover, incremental calibration is performed on the second image pair by storing the feature point pairs of the first optimization fundamental matrix and the first image pair, and selecting an optimization fundamental matrix for calibrating the second image pair by means of the predetermined threshold condition, thereby ensuring the accuracy and improving the processing efficiency.

The dual-view angle image calibration method of the embodiments may be performed by a camera, a processor, or a dual-camera device, etc. However, it should be apparent to a person skilled in the art that in practical applications, any device or processor having corresponding image processing and data processing functions may execute the dual-view angle image calibration method of the embodiments of the present disclosure with reference to the embodiments.

The embodiments provide an image processing method. Calibration is performed on at least one image pair of the same scene respectively photographed at two different view angles by using the dual-view angle image calibration method in Embodiment I or II, and application processing is performed on the calibrated image pair. The application processing may for example include, but is not limited to, any one or more of the following: three-dimensional reconstruction processing, image blurring processing, depth of field calculation, augmented reality processing, and the like.

In practical applications, the image processing method of the embodiments may be performed by a photographing device, and the photographed image pairs are processed in real time to improve the image processing efficiency. For example, calibration processing is performed on the photographed image by using the dual-view angle image calibration method, so that the matched feature points in the obtained image pair are located at the same depth, which facilitates online depth of field calculation of the image pair, thereby performing online image blurring to generate an image with a blurring effect, or performing online stereoscopic matching, three-dimensional reconstruction, augmented reality, and the like to obtain a three-dimensional stereoscopic vision image.

The image processing method of the embodiments may also be executed by a processor by invoking an image processing instruction or program to perform post processing on the dual-view angle image pair of the image processing program. For example, calibration is performed on the image pair by using the dual-view angle image calibration method to facilitate performing the depth of field calculation on the calibrated image pair, and further image processing is performed according to the calculated depth information. Moreover, a human-computer interaction item is set in the image processing program, which facilitates the user selecting an item for image processing, thereby increasing the operability of image processing and improving the user experience.

Any of the dual-view angle image calibration method or the image processing method provided by the embodiments of the present disclosure may be performed by any suitable device having data processing capability, including, but not limited to, a terminal device, a server, and the like. Alternatively, any of the dual-view angle image calibration method or the image processing method provided by the embodiments of the present disclosure may be executed by a processor. For example, the processor executes any of the dual-view angle image calibration method or the image processing method provided by the embodiments of the present disclosure by invoking a corresponding instruction stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing program codes, such as a Read-Only Memory (ROM), a Random-Access Memory (RAM), a magnetic disk, or an optical disk.

Figure 9:
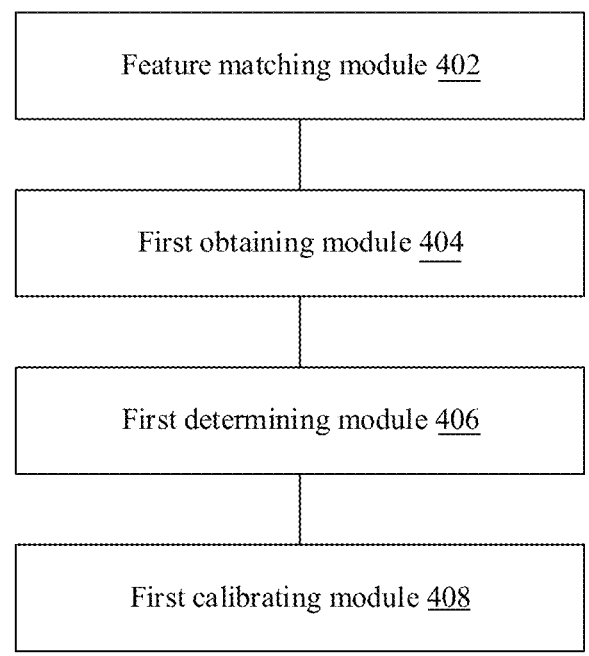
FIG. 9 is a logic block diagram of a dual-view angle image calibration apparatus according to one embodiment of the present disclosure.

FIG. 9 is a logic block diagram of a dual-view angle image calibration apparatus according to one embodiment of the present disclosure. Referring to FIG. 9, the dual-view angle image calibration apparatus of the embodiments includes: a feature matching module 402, configured to perform feature matching on a first image pair to obtain a first feature point pair set, where the first image pair includes two images respectively photographed corresponding to two different view angles of a same scene; a first obtaining module 404, configured to obtain multiple different first fundamental matrices of the first image pair at least according to the first feature point pair set, and obtain first image deformation information indicating relative deformation between the first image pair after mapping transformation is performed through the first fundamental matrices and the first image pair before the mapping transformation is performed; a first determining module 406, configured to determine a first optimization fundamental matrix from the multiple first fundamental matrices at least according to the first image deformation information; and a first calibrating module 408, configured to calibrate the first image pair according to the first optimization fundamental matrix.

The dual-view angle image calibration apparatus of the embodiments is configured to realize the corresponding dual-view angle image calibration method in the foregoing method embodiments, and has the beneficial effect of the corresponding method embodiments. Details are not described herein again.

Figure 10:
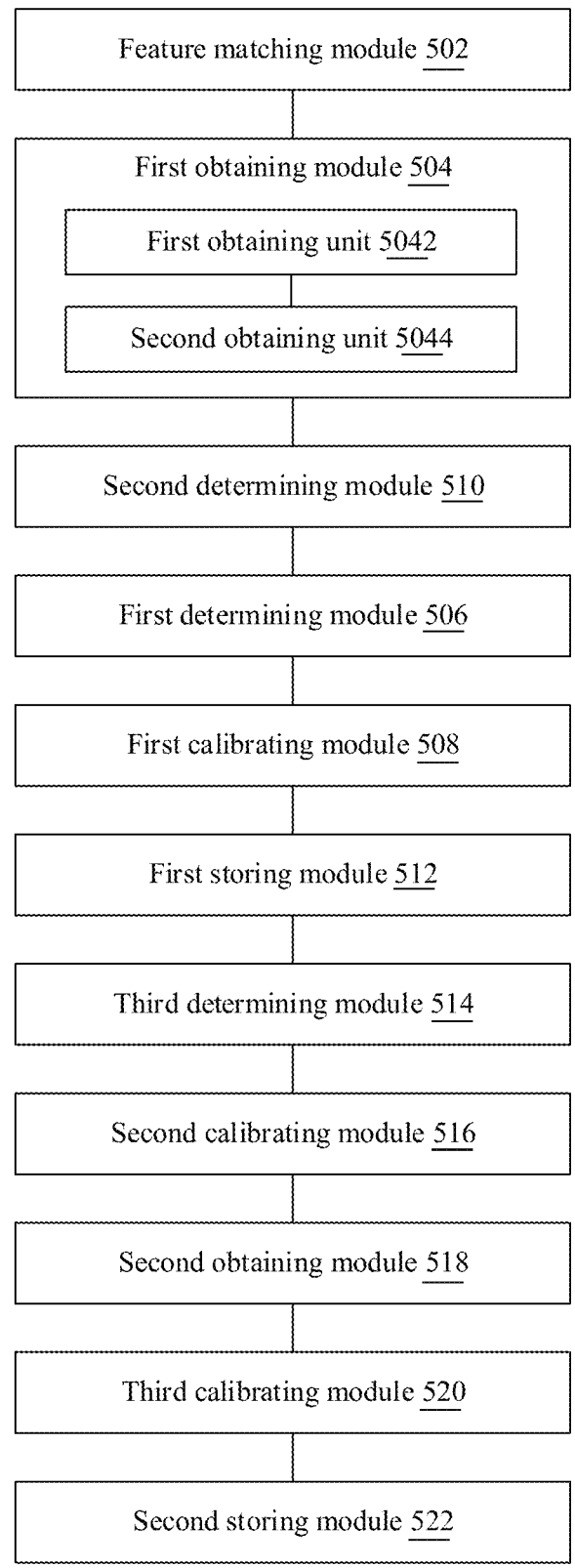
FIG. 10 is a logic block diagram of a dual-view angle image calibration apparatus according to another embodiment of the present disclosure.

FIG. 10 is a logic block diagram of a dual-view angle image calibration apparatus according to another embodiment of the present disclosure. Referring to FIG. 10, the dual-view angle image calibration apparatus of the embodiments includes: a feature matching module 502, configured to perform feature matching on a first image pair to obtain a first feature point pair set, where the first image pair includes two images respectively photographed corresponding to two different view angles of a same scene; a first obtaining module 505, configured to obtain multiple different first fundamental matrices of the first image pair at least according to the first feature point pair set, and obtain first image deformation information indicating relative deformation between the first image pair after mapping transformation is performed through the first fundamental matrices and the first image pair before the mapping transformation is performed; a first determining module 506, configured to determine a first optimization fundamental matrix from the multiple first fundamental matrices at least according to the first image deformation information; and a first calibrating module 508, configured to calibrate the first image pair according to the first optimization fundamental matrix.

In some embodiments, the first obtaining module 504 includes a first obtaining unit 5042, configured to perform mapping transformation on two images in the first image pair according to the first fundamental matrix, and obtain the first image deformation information according to the distance between at least one pair of corresponding feature points before and after mapping in each image.

In some embodiments, the first obtaining module 504 further includes a second obtaining unit 5044, configured to generate each of at least two first fundamental matrices according to a respective one of at least two different feature point pair subsets in the first feature point pair set.

In some embodiments, the apparatus further includes a second determining module 510, configured to determine matching error information of each feature point pair subset. The first determining module 506 is configured to determine the first optimization fundamental matrix from the multiple first fundamental matrices according to the matching error information and the first image deformation information.

In some embodiments, the matching error information includes a proportion of feature point pairs that do not satisfy a predetermined matching condition in the feature point pair subset or the first feature point pair set.

In some embodiments, the apparatus further includes a first storing module 512, configured to store or update the first optimization fundamental matrix.

In some embodiments, the first storing module 512 is further configured to store or update information of at least one feature point pair satisfying the predetermined matching condition and being in the first feature point pair set.

In some embodiments, a proportion of the number of stored or updated feature point pairs with respect to the total number of feature point pairs included in the feature point pair set is less than a set threshold.

In some embodiments, the information of at least one feature point pair satisfying the predetermined matching condition includes: coordinates of the at least one feature point pair satisfying the predetermined matching condition.

In some embodiments, the apparatus further includes: a second calibrating module 516, configured to calibrate a second image pair according to the first optimization fundamental matrix.

In some embodiments, the apparatus further includes a third determining module 514, configured to perform feature matching on the second image pair to obtain a second feature point pair set, and determine mapping cost information according to the second feature point pair set, where the mapping cost information includes second image deformation information of the second image pair and/or matching error information of the feature point pair subset. The second calibrating module 516 is configured to calibrate the second image pair according to the first optimization fundamental matrix in response to the mapping cost information satisfying a predetermined threshold condition.

In some embodiments, the apparatus further includes a second obtaining module 518, configured to obtain a second optimization fundamental matrix corresponding to the second image pair in response to the mapping cost information not satisfying the predetermined threshold condition; and a third calibrating module 520, configured to perform calibration on the second image pair according to the second optimization fundamental matrix.

In some embodiments, the second obtaining module 518 includes: a feature matching unit (not shown), configured to perform feature matching on the second image pair to obtain a second feature point pair set of the second image pair; a third obtaining unit (not shown), configured to obtain multiple different second fundamental matrices of the second image pair according to the second feature point pair set and the stored feature point pair, and obtain each of multiple pieces of the second image deformation information corresponding to a respective one of the multiple different second fundamental matrices; and a determining unit (not shown), configured to determine the second optimization fundamental matrix from the multiple second fundamental matrices at least according to the second image deformation information.

In some embodiments, the apparatus further includes a second storing module 522, configured to update the stored first optimization fundamental matrix by using the second optimization fundamental matrix, and/or update the stored feature point pair information by using information of at least one feature point pair in the second feature point pair set satisfying the predetermined matching condition.

In some embodiments, the apparatus further includes a photographing module (not shown), configured to photograph an image pair by means of a device having two cameras.

In some embodiments, the device having two cameras for example includes, but is not limited to: a dual-camera mobile terminal, dual-camera smart glasses, a dual-camera robot, a dual-camera unmanned aerial vehicle, or a dual-camera unmanned vehicle, etc.

The dual-view angle image calibration apparatus of the embodiments is configured to realize the corresponding dual-view angle image calibration method in the foregoing method embodiments, and has the beneficial effect of the corresponding method embodiments. Details are not described herein again.

The embodiments of the present disclosure also provide an image processing apparatus, configured to perform calibration on at least one image pair respectively photographed corresponding to two different view angles of a same scene by using the dual-view angle image calibration method according to Embodiment I or II, and perform application processing based on a calibrated image pair, where the application processing, for example, includes, but is not limited to, any one or more of the following: three-dimensional reconstruction processing, image blurring processing, depth of field calculation, and augmented reality processing, etc.

In practical applications, the image processing apparatus of the embodiments may include the dual-view angle image calibration apparatus of any of the foregoing embodiments.

The image processing apparatus of the embodiments is configured to realize the corresponding image processing method in the foregoing embodiments, and has the beneficial effect of the corresponding method embodiments. Details are not described herein again.

Figure 11:
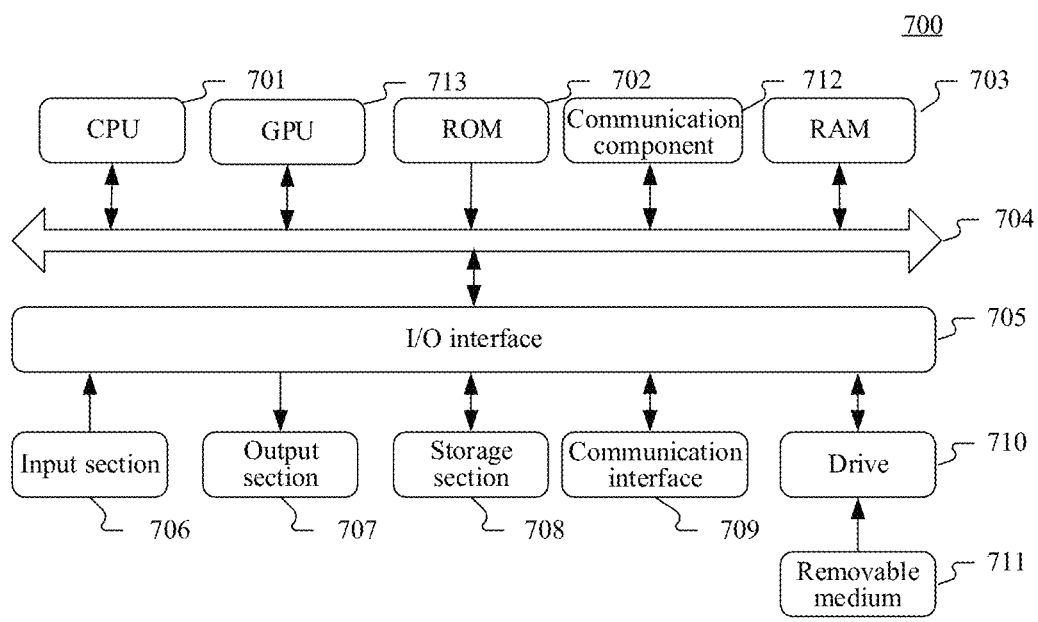
FIG. 11 is a schematic structural diagram of an electronic device according to one embodiment of the present disclosure.

The embodiments of the present disclosure further provide an electronic device which, for example, may be a mobile terminal, a Personal Computer (PC), a tablet computer, a server, and the like. Referring to FIG. 11 below, a schematic structural diagram of an electronic device 700, which may be a terminal device or a server, suitable for implementing one embodiment of the present disclosure is shown. As shown in FIG. 11, the electronic device 700 includes one or more first processors, a first communication element, and the like. The one or more first processors are, for example, one or more Central Processing Units (CPUs) 701 and/or one or more Graphic Processing Units (GPUs) 713 and the like, and may execute appropriate actions and processing according to executable instructions stored in an ROM 702 or executable instructions loaded from a storage section 708 to an RAM 703. In the embodiments, the first ROM 702 and the RAM 703 are collectively called a first memory. The first communication element includes a communication component 712 and/or a communication interface 709. The communication component 712 may include, but is not limited to, a network card. The network card may include, but is not limited to, an InfiniBand (IB) network card. The communication interface 709 includes a communication interface of a network interface card such as an LAN card and a modem, and the communication interface 709 performs communication processing via a network such as the Internet.

The first processor is communicated with the ROM 702 and/or the RAM 703 to execute executable instructions, is connected to the communication component 712 by means of a first communication bus 704, and is communicated with other target devices by means of the communication component 712, thereby completing operations corresponding to any dual-view angle image calibration method provided by the embodiments of the present disclosure, e.g., performing feature matching on a first image pair to obtain a first feature point pair set, where the first image pair includes two images respectively photographed corresponding to two different view angles of a same scene; obtaining multiple different first fundamental matrices of the first image pair at least according to the first feature point pair set, and obtaining first image deformation information indicating relative deformation between the first image pair after mapping transformation is performed through the first fundamental matrices and the first image pair before the mapping transformation is performed; determining a first optimization fundamental matrix from the multiple first fundamental matrices at least according to the first image deformation information; and calibrating the first image pair according to the first optimization fundamental matrix. Alternatively, operations corresponding to the image processing method provided by the embodiments of the present disclosure, e.g., performing calibration on at least one image pair respectively photographed corresponding to two different view angles of a same scene by using the dual-view angle image calibration method according to Embodiment I or II, and performing application processing based on a calibrated image pair, where the application processing, for example, includes, but is not limited to, any one or more of the following: three-dimensional reconstruction processing, image blurring processing, depth of field calculation, and augmented reality processing.

In addition, the RAM 703 may further store various programs and data required for operations of an apparatus. The CPU 701 or GPU 713, the ROM 702, and the RAM 703 are connected to each other by means of the first communication bus 704. In the presence of the RAM 703, the ROM 702 can be an optional module. The RAM 703 stores executable instructions, or writes the executable instructions to the ROM 702 during running, where the executable instructions enable the first processor to perform corresponding operations of the foregoing communication method. An Input/output (I/O) interface 705 is also connected to the first communication bus 704. The communication component 712 may be integrated, or may be configured to have a plurality of sub-modules (for example, a plurality of IB network cards) linked on the communication bus.

The following components are connected to the I/O interface 705: an input section 706 including a keyboard, a mouse and the like; an output section 707 including a Cathode-Ray Tube (CRT), a Liquid Crystal Display (LCD), a loudspeaker and the like; a storage section 708 including hardware and the like; and the communication interface 709 of a network interface card including an LAN card, a modem and the like. A drive 710 is also connected to the I/O interface 705 according to requirements. A removable medium 711 such as a magnetic disk, an optical disk, a magneto-optical disk, a semiconductor memory or the like is mounted on the drive 710 according to requirements, so that a computer program read from the removable medium is installed on the storage section 708 according to requirements.

It should be noted that the architecture illustrated in FIG. 11 is merely an example implementation. During some practices, the number and types of the components in FIG. 11 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the operations of the dual-view angle image calibration method provided by the embodiments of the present disclosure, e.g., performing feature matching on a first image pair to obtain a first feature point pair set, where the first image pair includes two images respectively photographed corresponding to two different view angles of a same scene; obtaining multiple different first fundamental matrices of the first image pair at least according to the first feature point pair set, and obtaining first image deformation information indicating relative deformation between the first image pair after mapping transformation is performed through the first fundamental matrices and the first image pair before the mapping transformation is performed; determining a first optimization fundamental matrix from the multiple first fundamental matrices at least according to the first image deformation information; and calibrating the first image pair according to the first optimization fundamental matrix. Alternatively, the program code may include instructions corresponding to operations of the image processing method provided by the embodiments of the present disclosure, e.g., performing calibration on at least one image pair respectively photographed corresponding to two different view angles of a same scene by using the dual-view angle image calibration method according to Embodiment I or II, and performing application processing based on a calibrated image pair, where the application processing, for example, includes, but is not limited to, any one or more of the following: three-dimensional reconstruction processing, image blurring processing, depth of field calculation, and augmented reality processing. In such embodiments, the computer program may be downloaded from a network by means of the communication element and installed, and/or be installed from the removable medium 711. When the computer program is executed by the first processor, functions provided in the method according to the embodiments of the present disclosure are executed.

In some embodiments, the electronic device 700 also includes at least two cameras. The first processor (including the CPU 701 and/or the GPU 713) is communicated with at least two cameras by means of the first communication bus.

Figure 12:
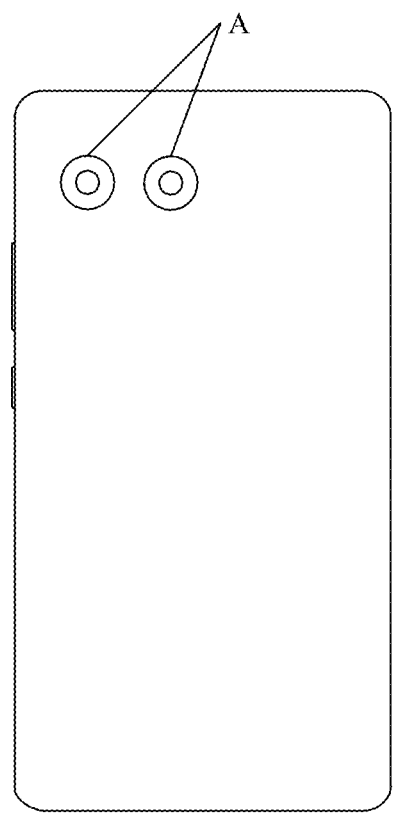
FIG. 12 is a schematic structural diagram of a dual-camera mobile phone according to one embodiment of the present disclosure.

In practical applications, the electronic device 700 may be a dual-camera mobile phone integrated with two cameras A as shown in FIG. 12. Components such as the first processor and the communication bus built-in the dual-camera mobile phone are not shown in FIG. 12. When the user uses the mobile phone to photograph an image pair, the two cameras transmit the photographed image to the first processor by means of the first communication bus, and the first processor may perform calibration on the image pair by using the dual-view angle image calibration method in the embodiments of the present disclosure. That is, the dual-camera mobile phone may perform automatic calibration on the photographed image pair.

Certainly, in practical applications, the electronic device 700 may also be other dual-camera mobile terminals except the dual-camera mobile phone, or dual-camera smart glasses, a dual-camera robot, a dual-camera unmanned aerial vehicle, and a dual-camera unmanned vehicle, etc.

In some embodiments, the electronic device 800 also includes at least two cameras. The second processor (including the CPU 801 and/or the GPU 713) is communicated with at least two cameras by means of the second communication bus.

In practical applications, the electronic device 800 may be a dual-camera mobile phone integrated with two cameras A as shown in FIG. 12. When the dual-camera mobile phone photographs the image pair, the two cameras transmit the photographed images to the second processor by means of the second communication bus, and the second processor may process the image pair by using the image processing method in the embodiments of the present disclosure. The calibrated image pair is processed directly based on the dual-view angle image calibration method of the embodiments of the present disclosure, and the image processing efficiency is high.

Certainly, in practical applications, the electronic device 800 may also be other dual-camera mobile terminals except the dual-camera mobile phone, or dual-camera smart glasses, a dual-camera robot, a dual-camera unmanned aerial vehicle, and a dual-camera unmanned vehicle, etc.

The methods, apparatuses, and devices in the present disclosure are implemented in many manners. For example, the methods, apparatuses, and devices in the present disclosure may be implemented with software, hardware, firmware, or any combination of software, hardware, and firmware. The foregoing sequence of the operations of the method is merely for description, and unless otherwise stated particularly, the operations of the method in the present disclosure are not limited to the described sequence. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The above are only optional implementations of the embodiments of the present disclosure, but the scope of protection of the embodiments of the present disclosure is not limited thereto. Any person skilled in the art could easily conceive that changes or substitutions made within the technical scope disclosed in the embodiments of the present disclosure should be included in the scope of protection of the present disclosure. Therefore, the scope of protection of the embodiments of the present disclosure should be determined by the scope of protection of the appended claims.

The invention claimed is:

1. A dual-view angle image calibration method, comprising:
performing feature matching on a first image pair to obtain a first feature point pair set, wherein the first image pair comprises two images respectively photographed corresponding to two different view angles of a same scene;
obtaining multiple different first fundamental matrices of the first image pair at least according to the first feature point pair set;
obtaining first image deformation information indicating relative deformation between the first image pair after mapping transformation is performed through the multiple different first fundamental matrices and the first image pair before the mapping transformation is performed;
determining a first optimization fundamental matrix from the multiple different first fundamental matrices at least according to the first image deformation information;
calibrating the first image pair according to the first optimization fundamental matrix;
storing or updating information of at least one feature point pair satisfying a predetermined matching condition and being in the first feature point pair set, and
calibrating a second image pair according to the first optimization fundamental matrix.

2. The method according to claim 1, wherein the obtaining first image deformation information indicating relative deformation between the first image pair after mapping transformation is performed through the multiple different first fundamental matrices and the first image pair before the mapping transformation is performed comprises:
performing mapping transformation on the two images in the first image pair according to the first fundamental matrix; and
obtaining the first image deformation information according to a distance between at least one pair of corresponding feature points before and after mapping in each image.

3. The method according to claim 1, wherein the obtaining multiple different first fundamental matrices of the first image pair according to the first feature point pair set comprises:
generating each of at least two first fundamental matrices according to a respective one of at least two different feature point pair subsets in the first feature point pair set.

4. The method according to claim 3, further comprising:
determining matching error information of each feature point pair subset;
the determining a first optimization fundamental matrix from the multiple different first fundamental matrices at least according to the first image deformation information comprises:
determining the first optimization fundamental matrix from the multiple different first fundamental matrices according to the matching error information and the first image deformation information.

5. The method according to claim 4, wherein the matching error information comprises a proportion of feature point pairs that do not satisfy the predetermined matching condition in the feature point pair subset or the first feature point pair set.

6. The method according to claim 1, further comprising:
storing or updating the first optimization fundamental matrix.

7. The method according to claim 1, wherein a proportion of a number of stored or updated feature point pairs with respect to a total number of feature point pairs comprised in the feature point pair set is less than a set threshold.

8. The method according to claim 1, wherein the information of at least one feature point pair satisfying the predetermined matching condition comprises:
coordinates of the at least one feature point pair satisfying the predetermined matching condition.

9. The method according to claim 1, further comprising:
performing feature matching on the second image pair to obtain a second feature point pair set, and determining mapping cost information according to the second feature point pair set, wherein the mapping cost information comprises at least one of second image deformation information of the second image pair or matching error information of the feature point pair subset;
the calibrating a second image pair according to the first optimization fundamental matrix comprises:
in response to the mapping cost information satisfying a predetermined threshold condition, calibrating the second image pair according to the first optimization fundamental matrix.

10. The method according to claim 9, further comprising:
in response to the mapping cost information not satisfying the predetermined threshold condition, obtaining a second optimization fundamental matrix corresponding to the second image pair; and
performing calibration on the second image pair according to the second optimization fundamental matrix.

11. The method according to claim 10, wherein the obtaining a second optimization fundamental matrix corresponding to the second image pair comprises:
performing feature matching on the second image pair to obtain the second feature point pair set of the second image pair;
obtaining multiple different second fundamental matrices of the second image pair according to the second feature point pair set and the stored at least one feature point pair satisfying the predetermined matching condition, and obtaining each of multiple pieces of the second image deformation information corresponding to a respective one of the multiple different second fundamental matrices; and
determining the second optimization fundamental matrix from the multiple different second fundamental matrices at least according to the second image deformation information.

12. The method according to claim 11, wherein the method further comprises at least one of the following operations:
updating the stored first optimization fundamental matrix by using the second optimization fundamental matrix; or
updating the stored information of the at least one feature point pair by using information of at least one feature point pair satisfying the predetermined matching condition and being in the second feature point pair set.

13. The method according to claim 1, further comprising:
photographing, by a device having two cameras, an image pair.

14. The method according to claim 13, wherein the device having two cameras comprises: a dual-camera mobile terminal, dual-camera smart glasses, a dual-camera robot, a dual-camera unmanned aerial vehicle, or a dual-camera unmanned vehicle.

15. The method according to claim 1, further comprising:
performing application processing based on the calibrated first image pair, wherein the application processing comprises at least one of the following: three-dimensional reconstruction processing, image blurring processing, depth of field calculation, or augmented reality processing.

16. A non-transitory computer readable storage medium having computer-readable instructions stored thereon, wherein execution of the instructions by a processor causes the processor to perform:
performing feature matching on a first image pair to obtain a first feature point pair set, wherein the first image pair comprises two images respectively photographed corresponding to two different view angles of a same scene;
obtaining multiple different first fundamental matrices of the first image pair at least according to the first feature point pair set;
obtaining first image deformation information indicating relative deformation between the first image pair after mapping transformation is performed through the multiple different first fundamental matrices and the first image pair before the mapping transformation is performed;
determining a first optimization fundamental matrix from the multiple different first fundamental matrices at least according to the first image deformation information;
calibrating the first image pair according to the first optimization fundamental matrix;
storing or updating information of at least one feature point pair satisfying a predetermined matching condition and being in the first feature point pair set, and
calibrating a second image pair according to the first optimization fundamental matrix.

17. An electronic device, comprising a processor and a memory;
the memory is configured to store at least one executable instruction, wherein execution of the at least one executable instruction enables the processor to execute the following operations:
performing feature matching on a first image pair to obtain a first feature point pair set, wherein the first image pair comprises two images respectively photographed corresponding to two different view angles of a same scene;
obtaining multiple different first fundamental matrices of the first image pair at least according to the first feature point pair set;
obtaining first image deformation information indicating relative deformation between the first image pair after mapping transformation is performed through the multiple different first fundamental matrices and the first image pair before the mapping transformation is performed;
determining a first optimization fundamental matrix from the multiple different first fundamental matrices at least according to the first image deformation information;
calibrating the first image pair according to the first optimization fundamental matrix;
storing or updating information of at least one feature point pair satisfying a predetermined matching condition and being in the first feature point pair set, and
calibrating a second image pair according to the first optimization fundamental matrix.

18. The electronic device according to claim 17, further comprising at least two cameras, wherein the processor and the at least two cameras complete communication with each other by means of a communication bus.

* * * * *